Figure 3:
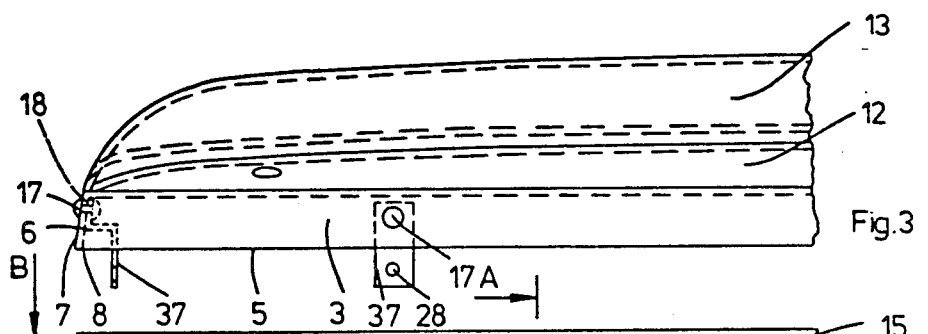

United States Patent [19]

Splithoff

[11] Patent Number: 4,480,869
[45] Date of Patent: Nov. 6, 1984

[54] ROOF WIND DEFLECTOR WITH MOUNTING SUPPORT

[75] Inventor: Theodor Splithoff, Hanau, Fed. Rep. of Germany

[73] Assignee: Ulrich Mobius, Hanau, Fed. Rep. of Germany

[21] Appl. No.: 347,039

[22] Filed: Feb. 8, 1982

[30] Foreign Application Priority Data

Feb. 7, 1981 [DE] Fed. Rep. of Germany ....... 3104309
Aug. 19, 1981 [DE] Fed. Rep. of Germany ....... 3132713

[51] Int. Cl.³ .............................................. B60J 1/20
[52] U.S. Cl. ................................... 296/217; 296/1 S; 411/107; 411/338; 411/401
[58] Field of Search ......................... 296/217, 1 S, 91; 411/107, 401, 338

[56] References Cited

U.S. PATENT DOCUMENTS 3,010,754 11/1961 Schumaker .......................... 296/1 S
4,171,846 10/1979 Isleif et al. ........................... 296/1 S Primary Examiner—Robert R. Song
Attorney, Agent, or Firm—Cushman, Darby & Cushman

[57] ABSTRACT

A roof wind deflector for motor vehicles having a stream lined design in aerodynamic respects, enabling an easy mounting and moreover offering a draftless and almost noiseless ventilation, which stands out for the fact that its front and sidewalls upon mounting are steeply towering above the roof of the motor vehicle, which walls gradually slope into an air guiding surface ascending in longitudinal direction of the car roof to the rear and ending in a raised flow-off surface, where the detachable fixture, being adaptable to various sunroof openings, comprises a sliding fastener arranged transversely to the longitudinal direction of the roof of the motor vehicle, with a sliding piece being movable thereon, which is connected between the wind deflector and, respectively, the motor vehicle.

32 Claims, 27 Drawing Figures

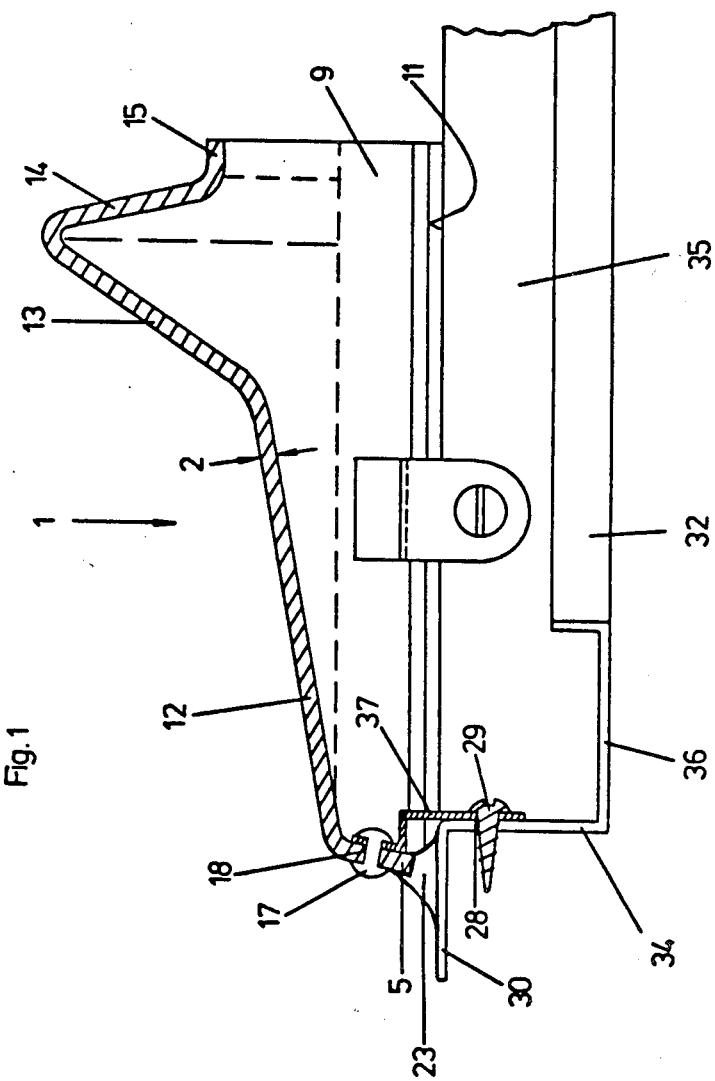

Fig. 2a A-A

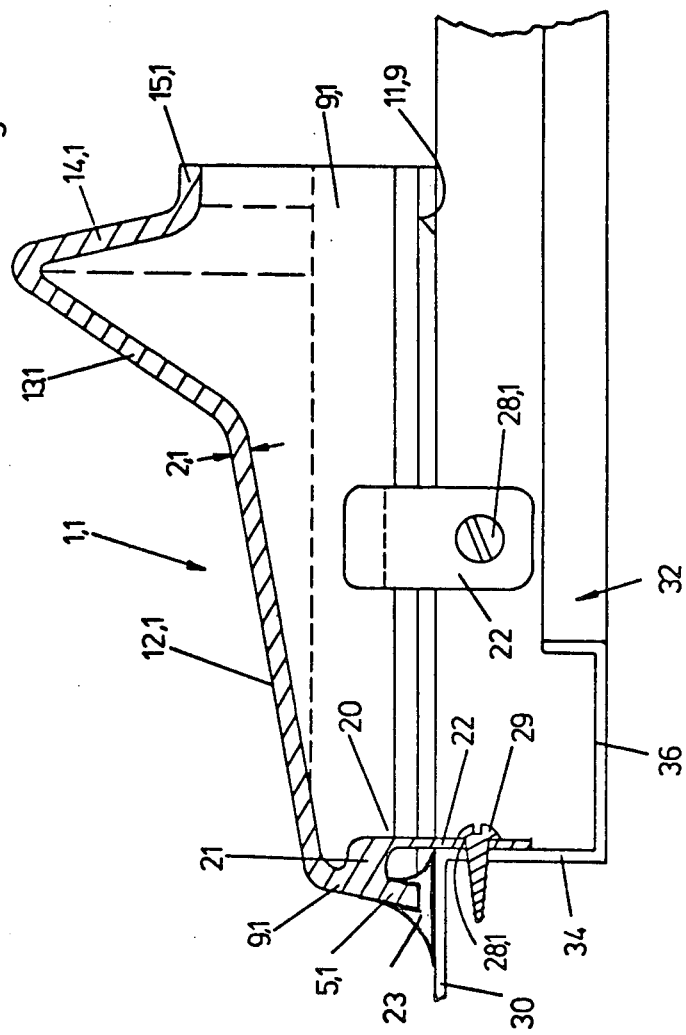

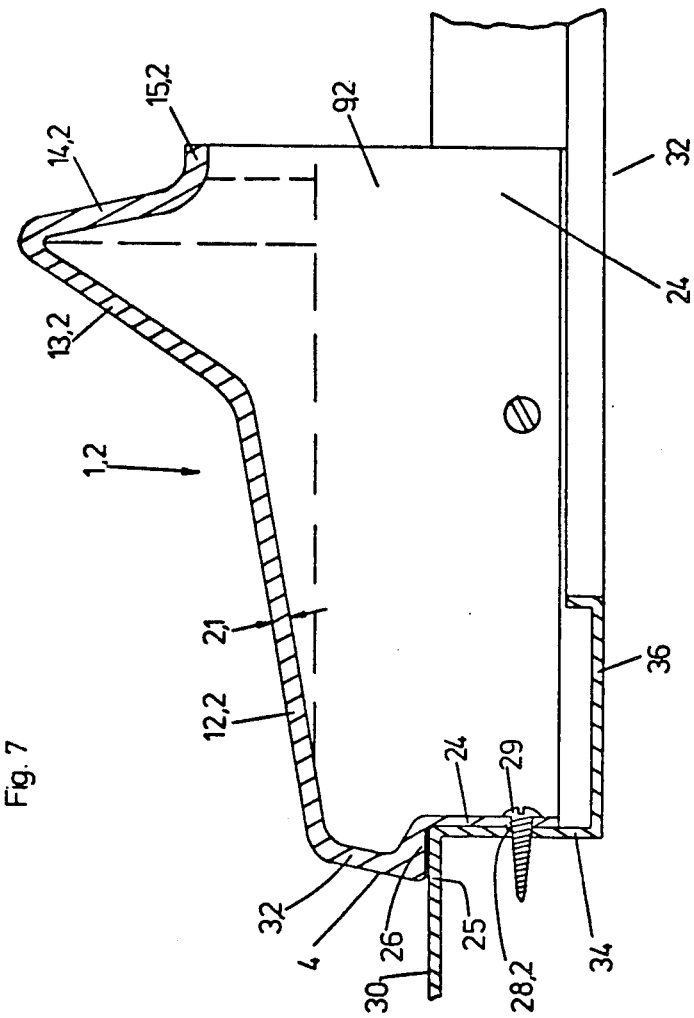

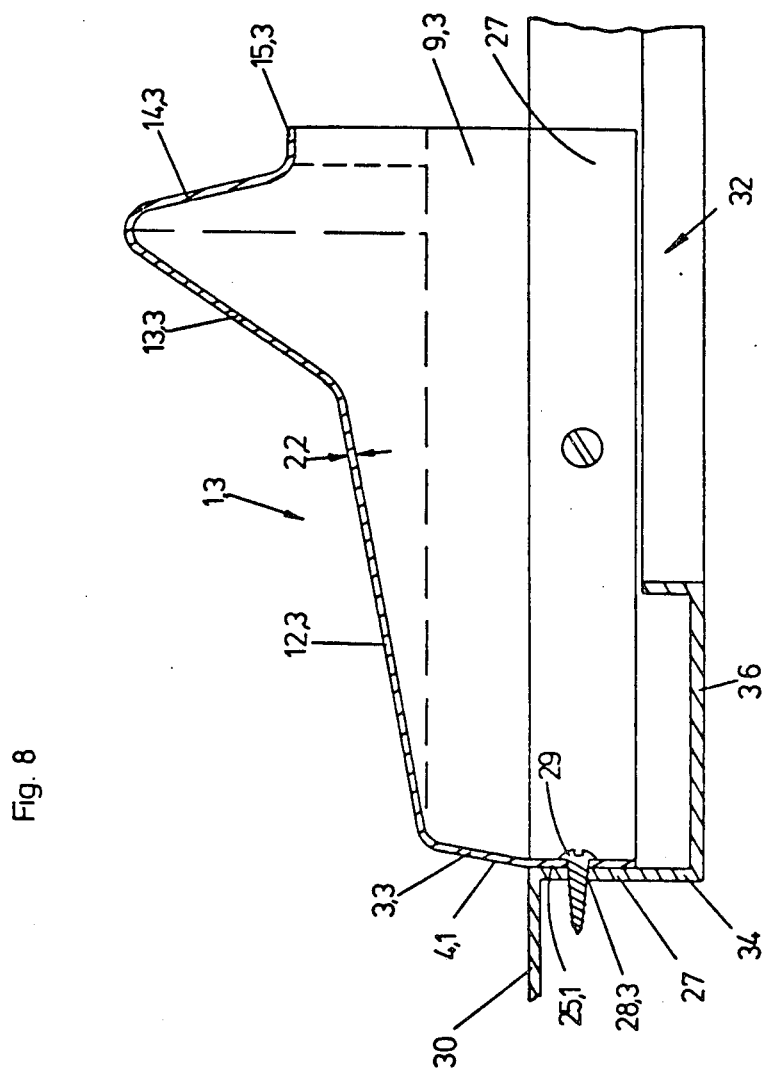

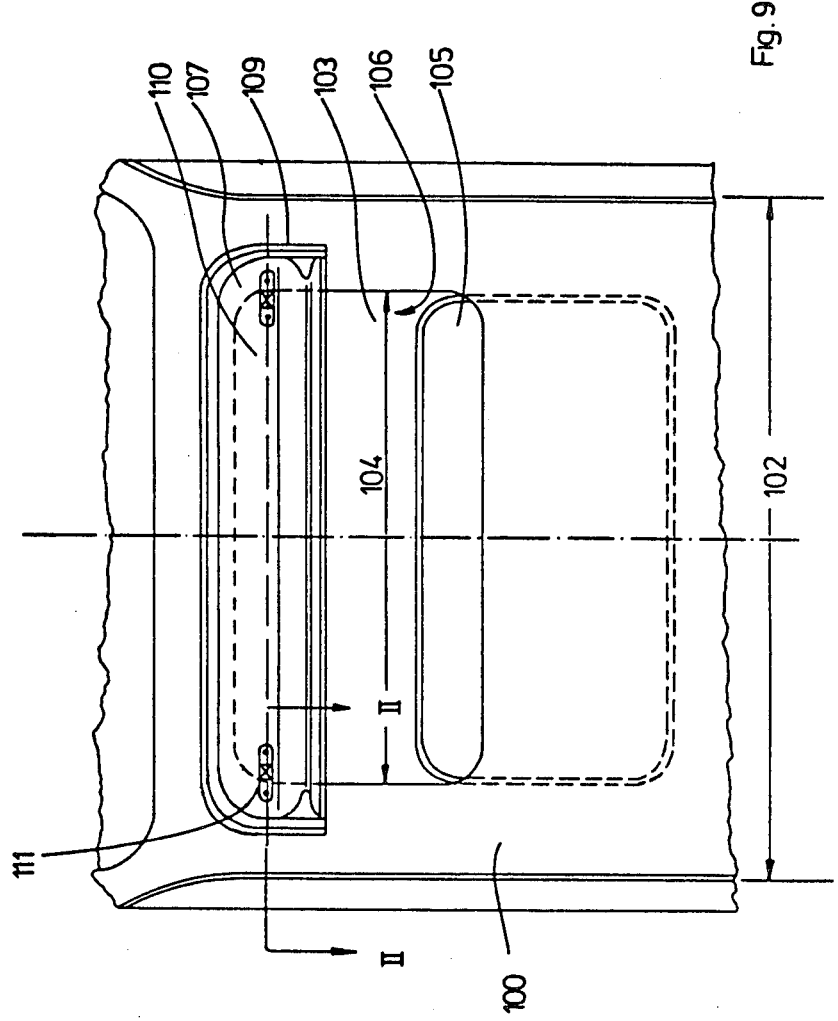

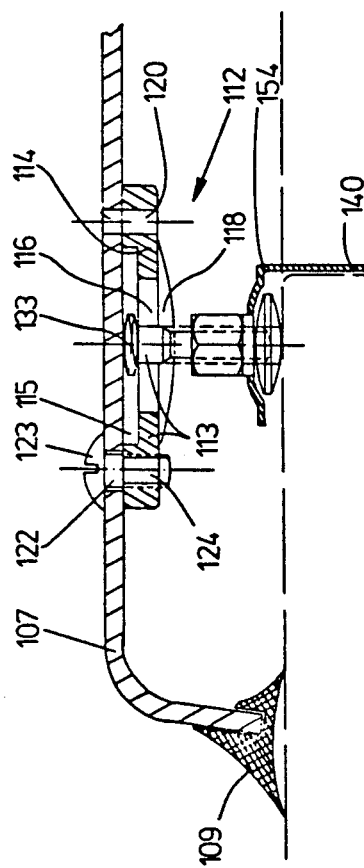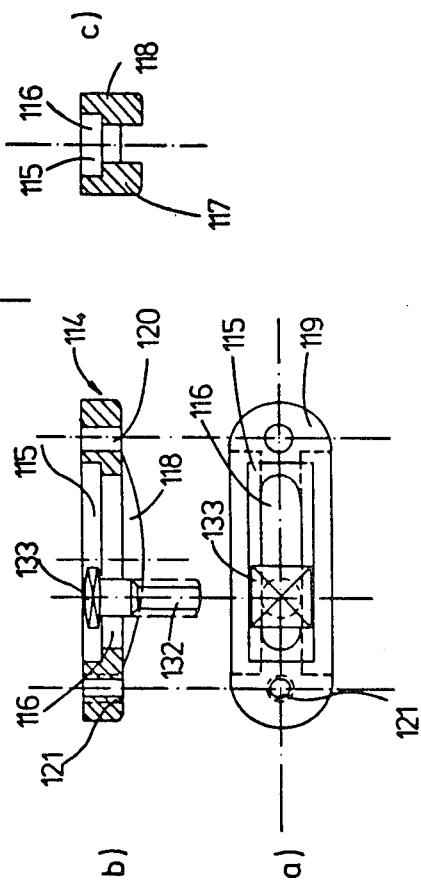

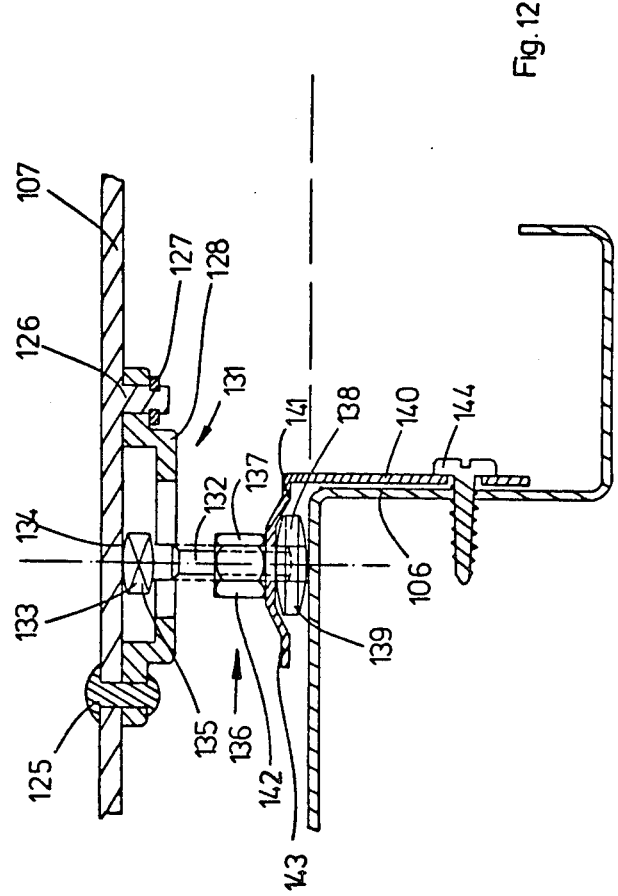

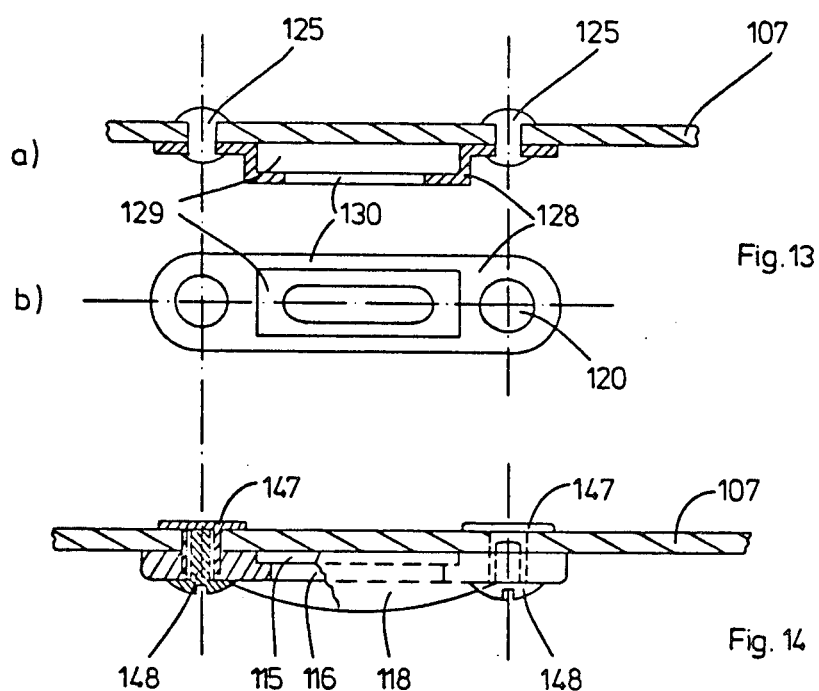

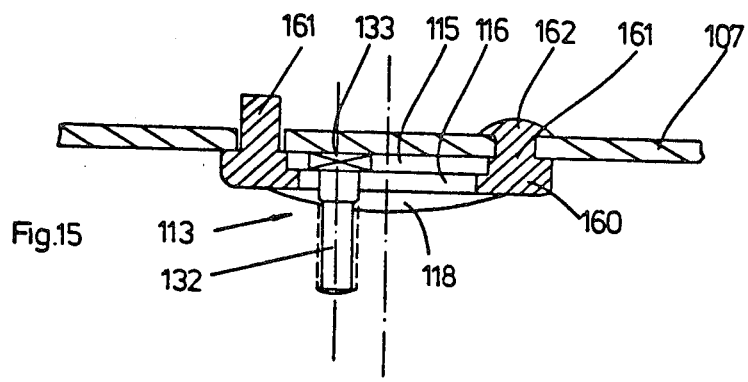
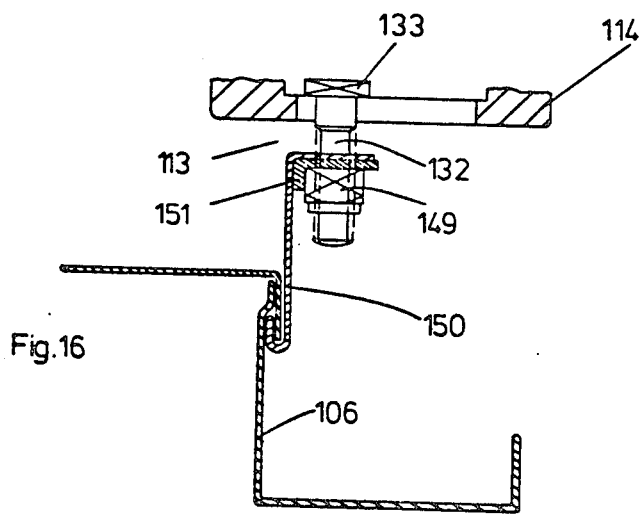
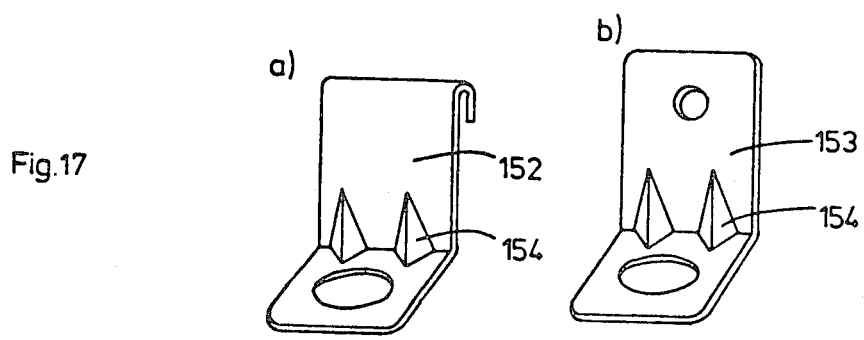

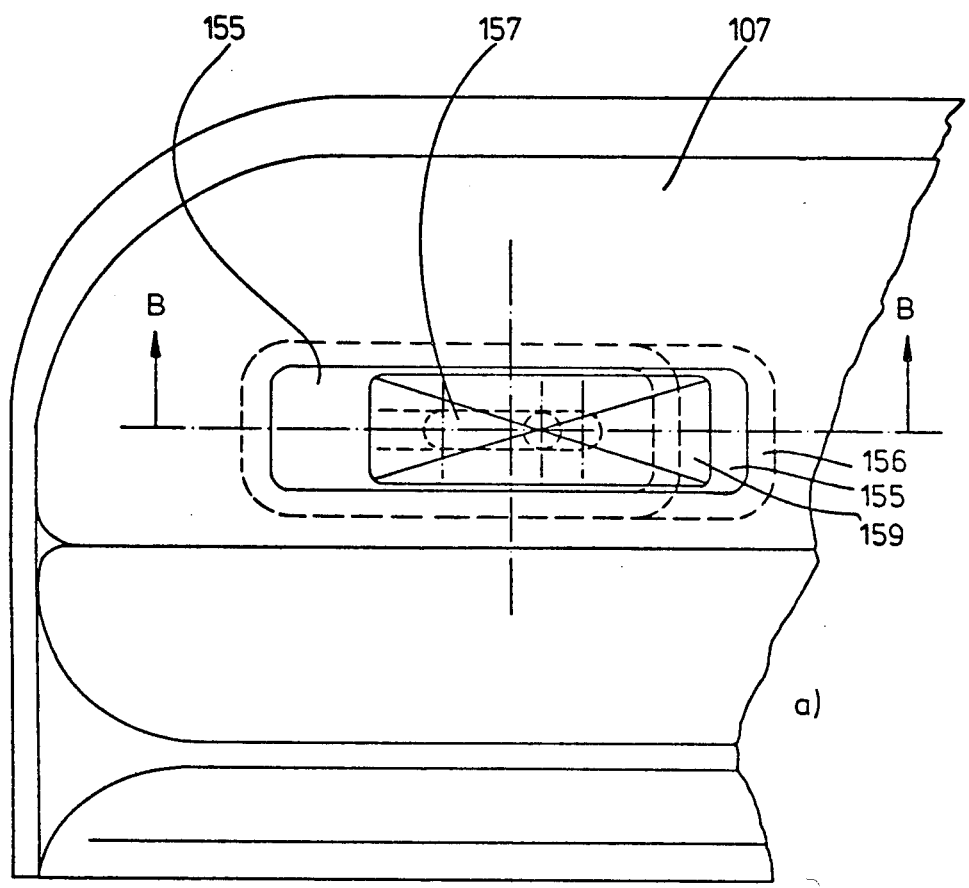
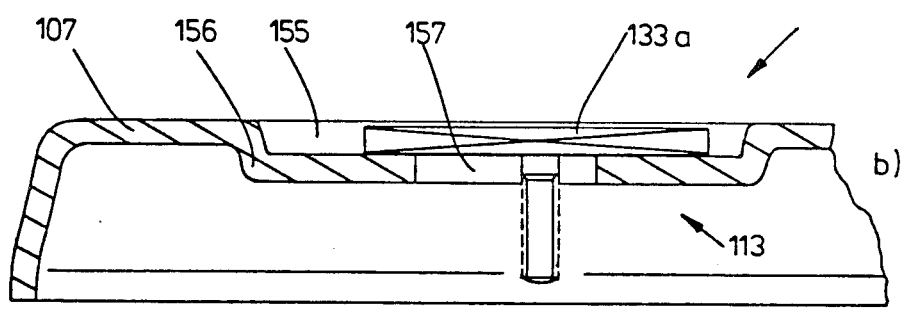
Fig. 18

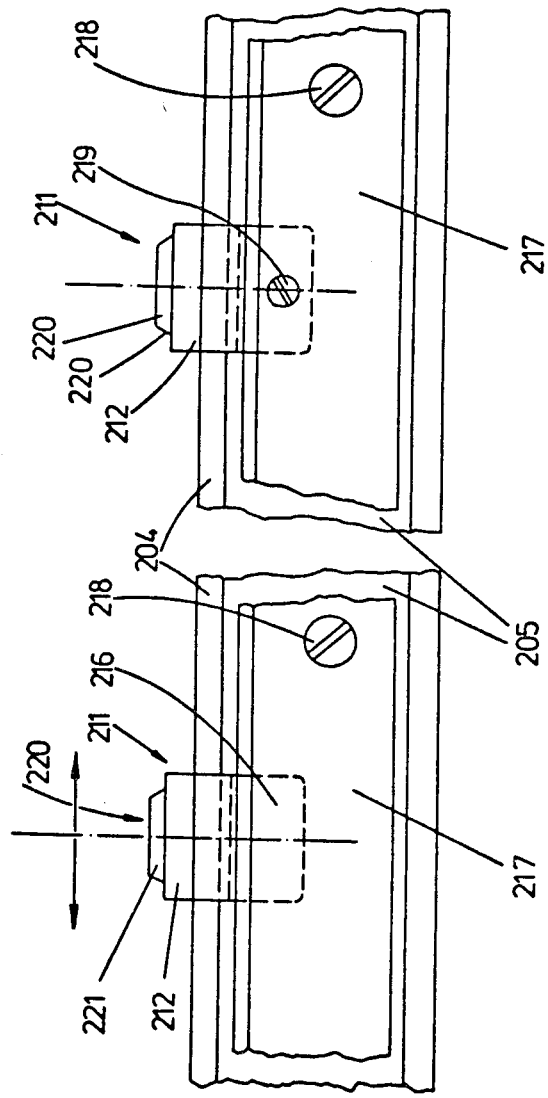

ROOF WIND DEFLECTOR WITH MOUNTING SUPPORT

The invention relates to a roof wind deflector for sunroofs of motor vehicles that can be screwed on at least one inner wall of the roof opening, as well as to fixtures for roof wind deflectors.

Roof wind deflectors have become known in different designs. They serve the purpose of partially covering the opened sunroof as e.g. a glass sunroof, and essentially preventing the entrance of disturbing noises or draft, respectively.

In a known roof wind deflector when in operating position, the flow-off edge of the air leading surface is arranged lower than the highest point of the arch (German Specification No. 1 555 891).

Tests in the wind tunnel have shown that a roof wind deflector constructed in such a manner must be made of relatively thick synthetic material, and that due to the special design of this roof wind deflector, when the sunroof is opened relatively much air—that is as a function of the driving speed—will enter the interior of the motor vehicle. Although by the special design of the leading surface of the roof wind deflector, the air flowing from the front against the motor vehicle is directed upward, this is not done to such an extent that the opened degree of the sunroof will be outside the effect of the air eddy passing back on the roof.

This design of the roof wind deflector not only has undesired draft formations resulting, most of all, in the rear part of the interior of the motor vehicle, but it is also the cause for noises being especially distinctive in certain speed ranges and in addition are contingent on the opening degree of the sunroof.

It is one object of the invention to provide an improved roof wind deflector protecting the interior of the motor vehicle to a greater degree from disturbing noises or draft, respectively, that can be produced in a simpler and cheaper manner, and which in addition can be more easily mounted on the motor vehicle than former roof wind deflectors.

It has been found that this problem can be solved in a simple manner in that the deflector has front and sidewalls, which in mounted condition are steeply jutting up from the roof of the motor vehicle, and which includes a surface having a leading surface area and which rises toward the rear along the longitudinal direction of the vehicle roof and has a steep slow-off surface at the rear area thereoff.

By this special construction differing in its form from known roof wind deflectors and essentially improved functioning of the new roof wind deflector, the flowing airstream is deflected upwards to such an extent that even with a fully opened sunroof no air whirl can flow back into the interior of the motor vehicle. It proved to be a further advantage that the roof wind deflector constructed according to the invention, due to its ingenious design can be shorter at least by one third than the known roof wind deflector. In view of the considerably advanced prices of plastics, this will have an especially advantageous effect on the manufacturing costs. What is more, by the special design of the profile of the roof wind deflector there will be a reinforcement as compared to the known roof wind deflectors in such a manner that the new roof wind deflector moreover can be made of thinner plastic material with a wall thickness of e.g. 3 mm or even 2 mm only. Even thinner wall thicknesses can be obtained by using fiberglass-reinforced plastic material. In one of the embodiments the roof wind deflector is made of relatively low-priced sheet-metal.

In detail, the roof wind deflector according to the invention is constructed in such a manner that its front and sidewalls are smoothly contoured into one another and also into the leading surface which rise toward the rear. This constructional design gives the new roof wind deflector not only an attractive exterior but altogether a form stability due to which smaller wall thicknesses will suffice. According to the invention the form stability is even increased by having the raised flow-off surface end in a backwall steeply sloping toward the roof of the motor vehicle, which backwall terminates with a reinforcing edge pointing in a right angle to the rear, which moreover provides the basis for molding in a conventional manner two roof wind deflectors simultaneously each time, which subsequently can be separated from each other along the center line of their prior common reinforcing edge.

In an embodiment example the new roof wind deflector is made of thermally workable and preferably transparent plastic material with a wall thickness of approx. 3 mm. Hereby holes can be provided in the leading surface for attaching the fixing means for retaining pieces.

However, with an appropriate design of the inner walls of the roof opening, holes for attaching fixing means for retaining pieces can also be provided in the front or sidewalls, respectively. These retaining pieces made essentially of metal or sheets, respectively, in an advantageous manner can be riveted to the front or sidewalls, respectively.

In another embodiment the roof wind deflector is made of injection-molded, preferably unbreakable and transparent plastics having a wall thickness of approx. 2 mm. Hereby the low costs of material, notwithstanding increased tool costs, on the whole will result in a reduced price of the new roof wind deflectors as compared to the known models.

It is an advantage of injection-molded plastic roof wind deflectors that retaining clips can be injection-molded onto the lower inner edges of the front and sidewalls.

In detail each retaining clip is composed of a relatively thick holding arm projecting from the lower region of the front and sidewalls, and an adjacent thin part essentially extending downward vertically to the roof of the motor vehicle, which part being parallel with the pertinent inner wall of the roof opening, is projecting into the same.

Injection-molded roof wind deflectors advantageously do not need any fastening means of metal. They can be mounted on the motor vehicle being practically theft-proof, and in addition they cause only little production cost due to their inexpensive manufacture.

According to the invention, the lower flanges of the front and sidewalls are leaning on the roof of the motor vehicle with an intermediate packing. Normally this packing is made of rubber. However, without making any changes to the gist of the invention, any other appropriate packing material can be used. The packing prevents the airstream from creeping through the gap between the lower edge of the roof wind deflector and the upper surface of the roof of the motor vehicle and thereby possibly causing disturbing noises.

A special example of embodiment of the invention is characterized thereby that the roof wind deflector is made as a plastic-injection molded part being provided with an endless thin attachable border.

In detail, in an embodiment example, the roof wind deflector can be designed in such a manner that the outer surfaces of its front and sidewalls as well as those of the thin attachable border are in alignment with each other.

In another embodiment the thin attachable border is moved back inwards with respect to the front and sidewalls. Both examples have the advantage that they can be mounted without any rubber packing. The insertable edge prevents the airstream from penetrating between the roof wind deflector and the roof of the motor vehicle or, respectively, from causing the undesired noises. The roof wind deflectors with attachable border designed according to the invention are made of unbreakable plastic material, e.g. polycarbonate. Furthermore it is advantageous that no fastening means of metal are required and that a 100% theft-proof is guaranteed. Besides only small production costs are needed.

In still another embodiment the roof wind deflector is made of metal, preferably sheet metal. It is manufactured—like e.g. car body parts—as a sheet metal stamping and treated as any other body part, preferably spray-painted.

The front and sidewalls of the roof wind deflector made of sheet metal are ending in an endless surrounding attachable border, too. It is profitable that a sheet steel stamping is made of extremely low-priced material, as compared to plastics. Further a economic production is made possible where the stamping as well as the punching of the openings can take place simultaneously in a single operation. The roof wind deflectors made of sheet metal can e.g. be varnished or even chromium-plated, matching the colour of the respective car.

Roof wind deflectors with an insertable edge do not require additional retaining parts. Likewise one does not have to put in a packing.

According to the invention, in the thin areas of the retaining clips or, respectively, in the endless surrounding plug-in edges there are provided openings for admitting the locking screws. All screws, retaining clips or rivets, respectively, that are not made of plastic material, in a preferred manner are made of rustproof or, respectively, non-corroding material.

Especially this invention also relates to a removable fixture for a roof wind deflector on motor vehicles, having at least two fastening devices adaptable to different roof or, respectively, sunroof opening widths, of which the upper parts are joined with the roof wind deflector and the lower parts, being flexibly attached thereto and projecting into the sunroof opening, are joined with the frame of the sunroof opening, and which fastening devices retain the roof wind deflector on the roof of the motor vehicle by using packing profiles along its front and side edges.

Conventional roof wind deflectors are fastened on the roof frame of the sunroof opening by known removable retaining means. These fixtures essentially are composed of bent-off tin bands, of which the upward extending ends are screwed up with the wind deflector and their lower ends are hung up in the roof frame.

Usually the roof wind deflectors are made in one size only, irrespective of the individual configuration of the roof of the motor vehicle or the openings of the sunroof. Their lower edges are provided with packing profiles so that the roof wind deflectors being clamped on the roof of the motor vehicle, will adapt themselves to different roof forms as a result of their own elasticity, too.

However, in order to make allowance for the different widths of the sunroof openings, the holes in the roof wind deflector for attaching the fastening screws would have to be bored at different places. In other conventional forms an individual fixture for the roof wind deflector must be provided for each opening widths of the sunroof. The width of the sunroof opening or, respectively of the roof is measured transversely to the longitudinal axis of the roof of the motor vehicle.

In order to provide a universally usable fixture for a roof wind deflector in view of these requirements, it has become known to make each fastening element of two rotatingly connected parts confining an angle, of which the first part can be fixed to the roof wind deflector and the other part to the roof frame. By turning the two parts in relation to each other, the distance between the vertical planes, in which on the one hand is the fastening point of the fixture at the roof frame and on the other hand the fastening point of the fixture at the roof wind deflector, can be varied in relatively wide ranges so that the wind deflector with one and the same fixture can be mounted not only on a motor vehicle roof having a relatively narrow roof opening but also to a car roof with a relatively wide roof opening (German Registered Design No. 76 37 309).

It became apparent, however, that with this fixture a roof wind deflector can indeed be adapted to different roof widths or sunroof opening widths, respectively, but that tensile forces are exercised on the roof wind deflector in its disadvantageous regions when being tightened. If, for example, the distances between the fastening of the fixture on the roof wind deflector and the fastening on the frame opening are too large, distortions or the like can be the result. If, for example, the working point of the hook on the frame relative to the working point of the fixture on the roof wind deflector is moved too far to the rear, it can happen that the front edge of the roof wind deflector is not properly pressed onto the roof of the motor car. If, on the other hand, the working point on the frame of the sunroof opening is arranged too far before the fastening point on the roof wind deflector, it can happen that the rear regions of the roof wind deflector are not properly tightened on the roof of the motor vehicle. In the course of time, especially due to sun or, respectively temperature influences, the result will be that the roof wind deflector loses its good snug fit on the roof of the motor vehicle.

Compared with this, the present invention has the object to provide an adaptable, detachable fixture for roof wind deflectors, especially of the afore described kind, which fixture will realize a snug fit of the roof wind deflector on the roof of the motor vehicle under any and all conditions and over an extended period of time.

It has been found that this object can be achieved in a simple manner in that each upper part of the fastening means is composed of a sliding means arranged transversely to the longitudinal direction of the car roof, with a slide part movably mounted thereon to which the respective lower part is screwed on. Advantageous developments of the object of the invention can be learned from the claims.

In detail the sliding means can have a displacing trough with a bottom slit for the sliding part. According to the invention, the sliding means is arranged along the optimum tightening axis on the roof wind deflector, which must be determined empirically. In this manner it is guaranteed that the pull on the roof wind deflector is always exercised in the most favorable axis of stress. Thereby the deflector cannot tilt upwards, either to the front or to the rear. In this manner, in addition to an ideal adaptability to diverse opening widths of the sunroof, an improvement of the fastening of roof wind deflectors is achieved. Moreover, the elements of the detachable fixture are either simple metal parts or simple injection-molded plastic parts. The detachable fixture according to the invention is especially qualified for the do-it-yourself mounting of roof wind deflectors.

In detail a sliding means has fastening openings on its diagonal faces for fastening means to be inserted in holes in the roof wind deflector or for fastening shoulders on the roof wind deflector. These fastening elements can be made of plastic material or metal, respectively.

In a first embodiment example of the invention, the displaceable trough is embedded in a displacing element made of plastics, of which the longitudinal edge areas pointing to the car roof are reinforced by ribs. By this means one succeeds in compensating as much as possible any distortions or deformations, respectively, of the displacing elements caused by different temperatures and aging symptoms.

In another example of embodiment the displaceable trough is molded or preferably impressed into a striplike displacing element made of sheet metal.

In both examples of embodiment the sliding piece is a slide screw with a hammer-shaped sliding head gliding in the displaceable trough. In order to become independent of diverse designs of the car roof, the hammer-shaped slide head can have upper and lower roundings in the direction of displacement, which roundings bring about a sufficient movability of the fixture relative to the frame of the sunroof opening.

The lower part of the detachable fixture is composed of a screw nut that can be screwed on the slide screw and provided with a head carrying a hook or, respectively, an inset or screw hook for a fastening screw. In order to guarantee sufficient flexibility also with this connection between upper and lower part of the detachable fixture, the head of the screw nut as well as that portion of the hook mounted on same can be provided with roundings matching with each other. Normally the screw nut is equipped with a square or hexagon hole, respectively, or a cross hole for tightening the fixture.

By a further especially preferably embodiment of the detachable fixture for roof wind deflectors the advantage shall be achieved that a material-saving and more simple production can take place, where at the same time the tightening of the roof wind deflectors on the roof of the motor vehicles is facilitated and improved.

It has been found that this problem can be solved in a simple manner by means of hooks with an essentially U-shaped portion, surrounding the inner edge of the roof opening and of which the upward-directed surface is connected with the roof wind deflector either rigidly or movably, and of which the downward directed surface on its outer edge has a contact flange extending into the inner edge of the motor vehicle, which flange can be fixed on the inner wall of the roof opening.

By the U-shaped configuration of the hook it is not necessary anymore that the regions to be connected with the roof wind deflector must be arranged above the roof opening. Although with the conventional fastening arrangements an elastic effect is obtained by this means, in order to reach this purpose, however, the distance between that portion of the hook positioned above the roof opening and the lower face of the roof wind deflector must be relatively great.

On the other hand, the hook part to be tightened with the roof wind deflector is positioned outside the roof opening. Hereby a transition of the tightening forces to the edge of the roof opening is basically rendered possible.

In detail, the contact flange in an embodiment example of the invention is infinitely movable—normally in direction of the motor car—along the inner wall or, respectively, the inner edge of the roof opening, and can be clamped thereon by means of a clamping band. In those cases where the front part of the roof opening is likewise provided with a distinct inner wall, the contact flange of the hook can also be connected to that wall.

The contact flange can also be fastened by a screw on the inner wall or, respectively, the inner edge of the roof opening at a place as the circumstances may require, if so desired, of if e.g. the design of the sidewall of the roof opening does not allow the mounting of a clamping band.

The U-shaped portion of the hook is dimensioned in such a manner that at least a portion of the inner surface of the downward pointing side of the U-shaped region of the hook is resting against the lower surface of the inner edge of the roof opening. Hereby the tightening pressure is transmitted to the edge of the roof opening. The U-shaped hook does not get loose, its tightening pressure does not stress the fastening of the detachable fixture on the inner wall of the roof opening. The U-shaped configuration of the hook is material-saving since only one, preferably U-shaped squaring-off is required. For reinforcing purposes, beads can be provided on the U-shaped hook part.

In a further embodiment of the invention the upward directed side of the U-shaped region of the hook is provided with an opening, of which the inner edge is trimmed in according to the shape of a cap nut for a tightening screw. In this manner one can make the distance between the upward-pointing side of the U-shaped region of the hook and the roof of the motor vehicle as little as possible, i.e. only so wide as the shape of head of the head nut does require.

Further embodiments of the invention will appear from the claims.

Figure 2:
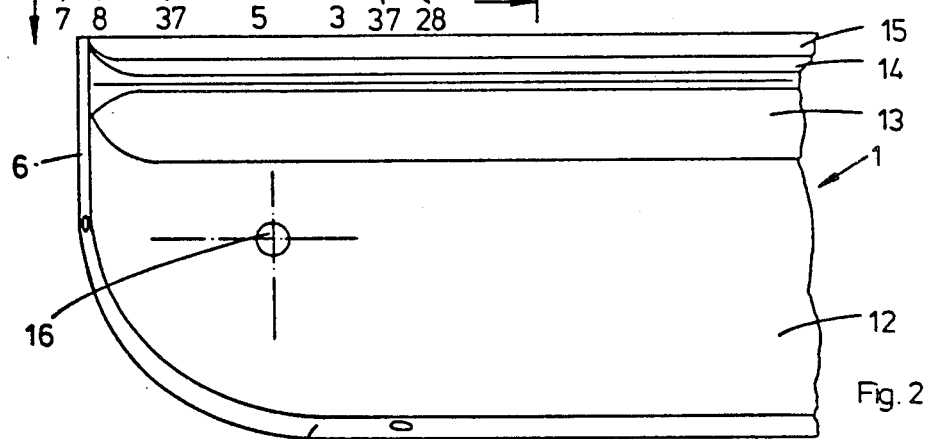
Figure 5:
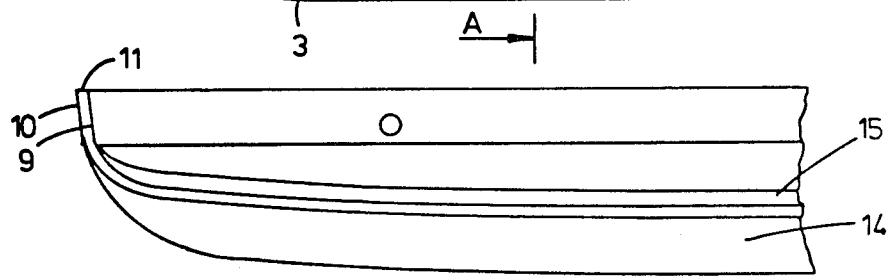
Figure 4:
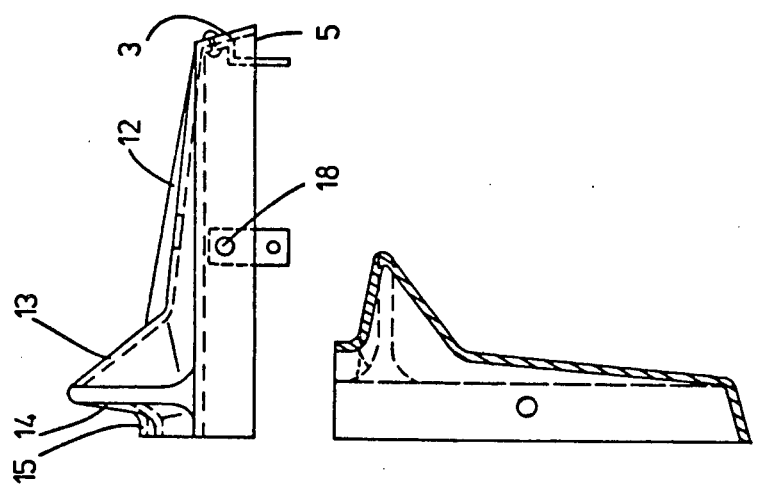
Figure 19:
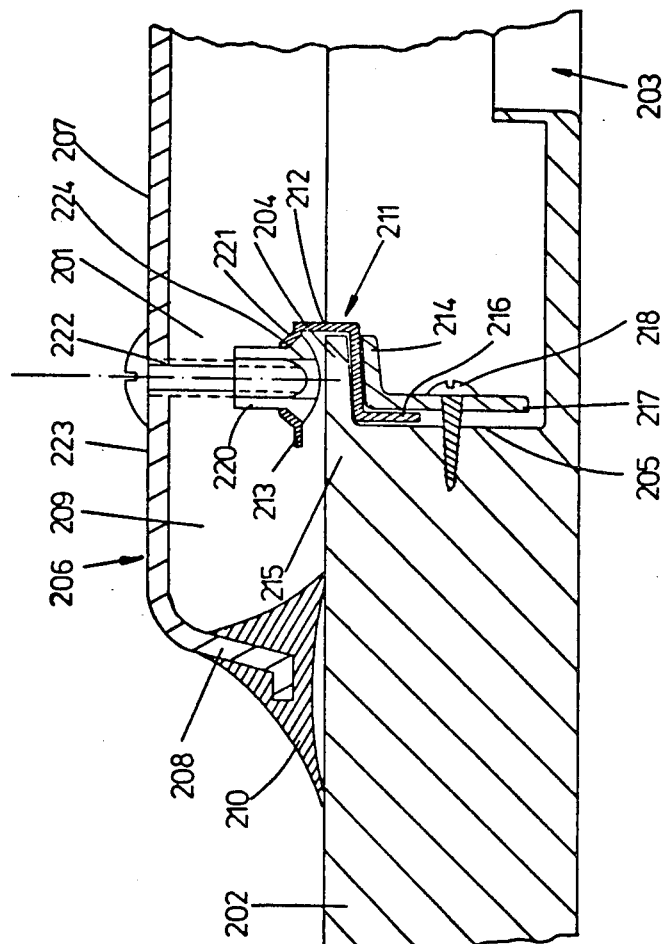

In the following preferred examples of the embodiment of the invention are explained by means of the attached drawings, where FIG. 1 is a section AA through a roof wind deflector according to FIG. 2, in longitudinal direction of the motor vehicle, FIG. 2 is a partial top view, FIG. 2a is a sectional view in elevation along lines A—A of FIG. 2, FIG. 3 is a partial front view, FIG. 4 is a side view, and FIG. 5 a rear view of a roof wind deflector according to FIGS. 1 and 2, FIG. 6 is a sectional drawing of another embodiment example of the invention according to the representation in FIG. 1, FIG. 7 is a sectional view of a further embodiment example of the invention, according to the representation in FIG. 1, FIG. 8 is a sectional view of a roof wind deflector made of metal, according to the representation in FIG. 1, FIG. 9 is a top view on the roof of a motor vehicle with a roof wind deflector in diagrammatic view, FIG. 10 is the sectional view along the line II II in FIG. 9, FIGS. 11a to 11c are different views of a sliding means, FIG. 12 is a sectional view along the line II II in FIG. 9, however, with a differently designed sliding means, FIGS. 13a and 13b show a sliding means made of metal, FIGS. 14 and 15 show different fixtures of sliding means on the roof wind deflector, FIGS. 16 and 17 represent different hook designs, FIGS. 17a and 17b are alternative perspective views of the attachment element of FIG. 16, FIGS. 18a and 18b show a holding device of a roof wind deflector, FIG. 19 is the sectional view of another alternative embodiment of a detachable fixture between a roof wind deflector and the roof of a motor vehicle, FIG. 20 shows a first construction detail, and FIG. 21 a further construction detail.

The FIGS. 1 to 5 represent a first embodiment example of a roof wind deflector according to the invention, and that in different sections or views, respectively, or partial views.

FIG. 2 is a partial top view on the new roof wind deflector 1, being represented in section along the line AA in FIG. 1. A merely outlined roof opening 32 receives the sunroof (not shown in detail). The roof opening 32 is fitted into the roof 30 of the motor vehicle and is limited by a front wall 34 and two sidewalls, of which only the sidewall 35 is outlined. The sidewalls 34 or, respectively, 35 are ending in a draining channel 36.

The roof wind deflector shown in FIG. 1 has an allover wall thickness 2, which e.g. is 3 mm. The roof wind deflector 1 is made of thermally workable and preferably transparent plastic material. Referring to FIGS. 1 to 5, the new roof wind deflector is composed of a front wall 3 and sidewalls 6 or, respectively, 9 which are smoothly contoured into each other but also contour into an air guiding surface 12 ascending to the rear. Upon mounting of the roof wind deflector 1, the front wall 3 and the sidewalls 6 or, resp. 9 are shaped to steeply extend up from the roof 30 of the motor vehicle. The air guide surface 12 ascends in the direction of the rear in longitudinal direction of the car roof and ends in a flow-off surface 13 being raised in relation to the car roof 30 but likewise relative to the air guiding surface 12.

By this design of the new roof wind deflector, a deflection of the roof wind is caused in such a manner that the air whirl hitting back onto the car roof 30 behind the roof wind deflector, can no longer enter the inside of the motor vehicle through the roof opening 32. In the wind tunnel, the gradient of the air guiding surface as well as that of the raised flow-off surface have been determined in such a manner that with the appropriate type of motor vehicle any current of air in the interior of the car will be safely prevented.

Due to its design, the new roof wind deflector 1 is dimensionally stable so that it can be shorter by approx. a third than the conventional roof wind deflectors. The back wall 14, at which also the raised flow-off surface 13 terminates, improves the dimensional stability and likewise favorably influences the air flow. The back wall 14 is precipitously inclined toward the roof 30 of the motor vehicle and ends in a reinforcing edge 15, projecting from the back wall 14 in a right angle. In combination with the backwall 14, the reinforcement edge will increase the dimensional stability of the roof wind deflector 1 and moreover furthers the evacuation of the air from the flow-off surface 13, and it is a prerequisite that two roof wind deflectors 1 can be produced at the same time by thermal molding. The two roof wind deflectors hang together by their reinforcing edges 15 and are separated from each other by cutting the edge 15 along the center line.

According to FIG. 1 the air guiding surface 12 can be provided with holes 16 for putting through conventional fastening means for retaining pieces.

In another embodiment example the upper regions of the front wall 3 or, respectively, of sidewalls 6 and 9 are provided with holes 18 for rivets 17, by means of which retaining pieces 37 are fastened on the roof wind deflector 1. Usually two retaining pieces 37 are fastened on the front wall 3, and likewise two retaining pieces 37 on both sidewalls 6 or 9, respectively.

Without making any changes to the core of the invention, according to FIG. 3, however, also only one retaining piece 37 respectively can be provided on each wall. The front wall 3 has a lower flange 5, the sidewall 6 a lower flange 8 and the sidewall 9 a lower flange 11, which are resting against the roof 30 of the motor vehicle with a packing 23 between them. Usually the packing 23 is made of rubber, however, it can also be made of any other packing material whatsoever. By the packing 23 it shall be prevented that travelling air can penetrate between the lower flange 5, 8 or, resp. 11 of the roof wind deflector 1 and the surface of the roof 30 of the motor vehicle and thereby possibly will cause undesired noises and drafts.

The retaining pieces 37 have holes 28 for locking screws 29, by means of which the roof wind deflector is fastened on the front wall or sidewalls 34, 35 respectively, of the roof opening 32.

FIG. 3 shows the upper curvature of the flow-off surface 13, the course of which being adapted to the curvature of the car roof. Normally the lower flanges 5; 8 or, resp. 11 of the roof wind deflector 1 are extending on the same level, as this is likewise apparent from FIG. 3.

The side view according to FIG. 4 clearly shows the special design of the arch-like interfaces between the sidewalls, the air guiding surface and the flow-off surface, as well as the backwall 14 of the roof wind deflector 1.

It is not difficult to learn from FIGS. 1 to 5 that the roof wind deflector 1 can be molded under little thermal influence of prepared sheets of plastic material, e.g. with a wall thickness of 3 mm. Due to its little wall thickness 2 and its relatively short design, the new roof wind deflector is considerably lighter than comparable roof wind deflectors of conventional design.

FIG. 6 shows a further embodiment example of the invention, where the roof wind deflector 1.1 is designed as a plastics-injection molded part with integral fastening clips. Normally the roof wind deflector 1.1 is made of a thinner plastic material with a wall thickness 2.1 of approx. 2 mm only. This example of embodiment, too, has a front wall 3.1 as well as sidewalls 6.1 and 9.1. These sidewalls are ending in lower flanges 5.1, 8.1 or, resp. 11.1 and like in the first embodiment example, are enclosed by a packing 23.

FIG. 6 shows that retaining clips 20 are injection-molded onto the lower inner regions of the front and sidewalls 3.1, 6.1 or, resp. 9.1. Each retaining clip is composed of a relatively thick holding arm 21 projecting from the lower region of the front wall 3.1 or, resp. the sidewalls 6.1 and 9.1, which arm is grading into a subsequent thin region 22 essentially extending vertically downwards to the car roof 30. In this thin area 22 a hole 28.1 for a retaining screw 29 is provided, by means of which the roof wind deflector 1.1 is screwed onto the front wall or, resp. sidewalls 34, 35 of the roof opening 32. Usually in the embodiment example according to FIG. 6, four retaining clips 20 are provided, and that two retaining clips 20 on the front wall 3.1 and one retaining clip each on the sidewalls 9.1 and 6.1.

FIG. 7 shows a cross-cut through a roof wind deflector 1.2 with an air guiding surface 12.2, a flow-off surface 13.2, a backwall 14.2 and a reinforcing edge 15.2. The roof wind deflector 1.2 according to FIG. 7, too, has a front wall 3.2 as well as sidewalls 6.2 or, resp. 9.2. The roof wind deflector 1.2 is likewise designed as an injection-molded plastic part and provided with an endless surrounding thin plug-in edge 24, in which the front wall 3.2 as well as the sidewalls 6.2 or, resp. 9.2 are ending. The plug-in edge has the advantage that the mounting of the roof wind deflector 1.2 can be made without any rubber packing and above all it is theft-proof. No fastening pieces of metal are required.

In the shown embodiment example according to FIG. 7, the plug-in edge 24 is back inwards with respect to the front wall or, resp. the sidewalls by a step 26. Consequently, when being plugged in, the step 26 is resting upon the opposite arch-shaped configuration of the roof 30 of the motor vehicle. In the plug-in edge there are provided holes 28.2 for screws 29, by means of which the roof wind deflector 1.1 is fastened on the inner walls 34, 35 of the roof opening 32. A rubber packing is not required.

Usually the plug-in edge 24 has a wall thickness of 0.7 mm only.

In an embodiment example (not shown) the outer surface 4 of the front wall 3.2 of the roof wind deflector 1.2 can also be flush with the outer surface 25 of the plug-in edge 24. Such a construction is described in connection with FIG. 8.

The roof wind deflector 1.2 shown in FIG. 7, too, is of lighter weight and thus less expensive than models of roof wind deflectors that have been known since. Also the roof wind deflector 1.2 has only two-thirds the length of the conventional roof wind deflectors and has a wall thickness 2.1 of merely 2 mm.

FIG. 8 finally shows a further embodiment of the invention, that can either be formed as a pressed piece of sheet metal like standard body parts or made of fiber-glass-reinforced plastic.

The roof wind deflector 1.3, too, has an air guiding surface 12.3 as well as a flow-off surface 13.3, ending in a backwall 14.3 with reinforcing edge 15.3. The front wall 3.3 as well as the sidewalls 6.3 or, resp. 93 are gradating into an endless surrounding plug-in edge 27, in which holes 28.3 for holding screws 29 are provided. The outer surface 4.1 of the front and sidewalls is flushly ending in the outer surface 25.1 of the continuous plug-in edge 27.

The wall thickness 2.2 of the embodiment according to FIG. 8 is extremely thin, as this can be brought about by the fiberglass-reinforced plastic or, respectively, by the sheet metal of the pressed piece.

Preferred embodiments of detachable fixtures of the roof wind deflectors are shown in FIGS. 9 through 21.

FIG. 9 is a top view on the front section of the roof 100 of a motor vehicle, in which a sunroof opening 103 is provided wherein a sunroof 105 can move in the usual manner. The width 102 of the roof is varying according to the respective type of car. The opening width 104 of the sunroof, too, changes according to the different motor vehicle types.

The sunroof opening 103 is defined by a frame 106 merely outlined in FIG. 9. In front of the sunroof opening 103 a roof wind deflector 107 is outlined that shall prevent the travelling air from entering the inner of the motor vehicle through the opened sunroof. As it will become apparent in detail further below, the lower edges of the front and sidewalls of the roof wind deflector 107 are encircled by a packing profile 109, which is resting on the car roof 101 as is appears e.g. from FIG. 10.

In the roof wind deflector holes 118 (FIG. 10) are provided, through which fastening means (screw bolts 122, rivet 125, FIGS. 12, 13 or, resp. nut 147 and screw 148, FIG. 14) are projecting to the lower surface of the roof wind deflector 107, which are components of detachable fixtures 111 for the roof wind deflector 107, by means of which the deflector can be fastened on the frame 106 of the sunroof opening 103. According to FIG. 9, the detachable fixtures 111 are positioned on a so-called optimum tightening axis 110 that has been determined empirically. If coinciding with this optimum tightening axis, tensile forces are exercised upon the roof wind deflector, the same will rest on the surface of the car roof 101 in an optimum manner by interposing the packing profile 109.

This optimum fixture is not effective if the detachable fixtures 111, in direction of the vehicle, are acting before or, resp. behind the optimum tightening axis. Either the tight seat along the front edge will become insufficient or there is the risk that the rear regions of the roof wind deflector 107 will detach themselves more or less from the roof of the motor vehicle. These insufficient fixtures of the roof wind deflector 107 will increase in the course of time by the influence of different temperatures or, resp. simply due to the aging process of the plastic material.

FIG. 10 that represents a section along the line II II according to FIG. 9, shows a fastening means 112 by means of which each side of the roof wind deflector 107 is tightened onto the roof 101 of the motor vehicle. An upper part 113 is composed of a sliding element 114, which according to FIG. 10 as well as FIGS. 11a to 11c is made of plastics and provided with a displacing tub followed by an open bottom slit 116. The longitudinal edges 117 of the displacing tub 115 are reinforced by means of ribs 118. The transverse sides 119 facing each other of the sliding element 114 are provided with fastening openings 120 having even inner surfaces or threads 121, respectively. The sliding element 114 represented in FIGS. 10 and 11 is fastened on the roof wind deflector 107 by means of fastening screw bolts 122, which have a head 123 and are stuck through the holes 118 in the roof wind deflector 107 and screwed together with the thread 121 of the fastening openings 120. For this purpose, the square or, resp. hexagon portion 124 are engaged with an appropriate tool.

FIG. 12 shows a slightly modified embodiment of a sliding element 128, which has been made of sheet metal. In principle its construction equals that of the sliding element 114 being made of plastic material, e.g. injection-molded, whereas the sliding element 128 is pressed or, resp. stamped from sheet metal. The left side of FIG. 12 shows how sliding elements 114 or, resp. 128 can be fastened on the roof wind deflector 107 by means of rivets 125. Another kind of fastening is shown on the right side of FIG. 12, where fastening lugs are projecting from the lower side of the roof wind deflector, on which the sliding elements 114 or, resp. 128 are secured e.g. by shaft locks 127 or rivet heads (not shown), which e.g. can be formed by ultrasonic processing of the through-projecting parts of the fastening lugs 126.

A displacement tub 129 and the bottom slit 130 in FIGS. 13, 14 correspond to the tub 115 or, respectively, the slit 116 according to FIGS. 9 and 11.

The sliding piece generally marked with 131 is constructed as a sliding screw 132 with a sliding head 133, being outlined in top view in FIG. 11a. It has an upper rounding 134 as well as a lower rounding 135 enabling a slight displacement of the sliding head 133 in the displacement tub 115 or, resp. 129 and a permits a pendulum like motion of the entire construction, whereby the fastening on the frame 106 of the sunroof opening 103 will be facilitated. According to FIG. 12 the sliding piece 131 can swing back and forth parallel to the frame 106 of the sunroof opening with not inconsiderable deflection angles.

Hinged to the sliding piece 131 is a lower part generally marked with 136, being composed of a screw nut 137 and a hook 40 hinged to the head 138 of that nut. The head 138 has a lower rounding 139 and the hook 140 has a corresponding rounding 141, whereby flexibility is guaranteed between the parts 131 and 140.

The sliding piece 131 is provided with a square or, resp. hexagon 142, through which the sliding screw 132 can be pulled downward so that the desired tension is generated between the roof wind deflector 107 and the roof of the motor vehicle. Instead of the square or, resp. hexagon 142, a cross-hole 143 can also be provided for putting on a screw tool.

The hook 140 is screwed onto the frame 106 of the sunroof opening by means of a fastening screw 144. The fastening screw 144 can be a self-tapping screw.

FIG. 13 shows a sliding element 128 made of metal, being connected to the roof 107 of the motor vehicle by means of rivets 125. The displacement tub 129, the bottom slit 130 and the fastening openings 120 can be dimensioned like those for the sliding element 114 of plastic material.

FIG. 14 shows another manner of fastening a sliding element 114 or, resp. 128 on the roof wind deflector. As fastening means one uses head nuts 147, which are stuck through the holes 108 on the roof wind deflector and the fastening openings 120 in the sliding element 114 or, resp. 128. From below, screws 148 are screwed into the head nuts 147, by which the sliding element 114 or, resp. 128 is tightly secured to the roof wind deflector 107. The head nuts 147 or screws 148, respectively, can be made of plastic material or metal, respectively.

According to FIG. 15 a sliding element 160 of plastic material has lugs 161 extending upwards, of which the one shown on the left in FIG. 15 is represented in its original configuration. By means of suitable ultrasonic apparatus, the projecting end of the lug 161 can be formed into a rivet head 162 as shown on the right. In combination with this sliding means one can use e.g. sliding screws 132 with a sliding head 133.

In FIG. 10 it is indicated that the hook 140 is provided with a reinforcing thickness 154, eliminating a resilience at the point of wind-off and enabling a secure tightening of the roof wind deflector 107.

FIGS. 17a and b show an inset hook 152 or, resp. a screw hook 153, being provided with at least a reinforcing thickness 154. In FIG. 17 two reinforcing thicknesses are indicated to the right and to the left of the screw hole.

FIG. 16 represents a further possibility of reinforcing an inset hook 150. To this effect a reinforcing piece 151 is provided, being fixed on the hook in such a manner that the sliding screw 132 can be stuck through the opening in the hook as well as through a respective opening in the reinforcing piece 151. The reinforcing piece 151 has an angular lug resting on the correspondingly configured shape of the inset hook 150 and in this manner safely prevents a deformation of the inset hook 150.

In FIG. 16 there is further shown a square nut 149, being rigidly connected with the reinforcing piece 151 and thus also with the suspendable hook 150. When using a square nut 149, the sliding screw at its lower end must be provided with an inner square or, resp, hexagon 124 according to FIG. 10 and with a round sliding head 133.

FIG. 18a and FIG. 18b show a sliding means 170, being configured as an oblong displacement tub 155 that can be lowered into the roof wind deflector 107, with sidewalls 156 and a bottom slit 157. The displacement tub 155 is produced together with the roof wind deflector 107 in one course of manufacture. From FIG. 18b one can see that the sidewalls 156 give the sliding means 170 a sufficient strength and rigidity.

In connection with the sliding means 170 a sliding screw 132a with an oblong sliding head 133a is put into action, which head will cover the bottom slit 157 in every position of displacement. FIG. 18b shows a section along the line BB in FIG. 18a. Like in the above described embodiment examples, the displacing means herein is likewise arranged along the optimum tightening axis 110 of the roof wind deflector 107. The above described lower parts 136 can be mounted on the displacing screw 132a.

A further preferable alternative embodiment of a detachable retaining means will appear from FIGS. 19 to 21.

FIG. 19 is a sectional view of the roof 202 of a motor vehicle and a roof wind deflector 206 that is tightened onto the car roof 202 by means of a detachable fixture 201. The roof wind deflector 206 has an air-guiding surface 207 which in a conventional manner is normally ascending to the rear, a front wall 208, as well as sidewalls 209, of which only one is shown. The lower regions of the front wall 208 and the sidewalls 209 are enclosed by a packing profile resting on the roof of the motor vehicle.

The roof wind deflector 206 is arranged above the front region of a roof opening 203 having a distinct inner edge 204 as well as an inner wall 205 which in any case is arranged on the sides of the roof opening 203.

The detachable fixture 201 according to the invention is composed of a hook 211 and a tightening screw 222, being stuck from above through a respective opening in the roof wind deflector 206. The tightening screw 222 and the hook 211, in this embodiment example are joined by means of a head nut 223.

The hook 211 must be provided with an essentially U-shaped region 212 enclosing the inner edge 204 of the roof opening 203. The upward pointing face 213 of the hook 211 is connected with the roof wind deflector 206 either stationary or movably. The downward pointing face 214 of the U-shaped region 212, on its outer edge 215 is provided with a flap 216 projecting into the interior of the motor vehicle, which flap can be fixed on the inner wall 205 of the roof opening 203. The shown inner wall 205 is extending in longitudinal direction of the motor vehicle.

In connection with FIG. 20 it appears from FIG. 19 that the butting flap 216 is continuously movable along the inner wall 205 or, resp. the inner edge 204 of the roof opening 203, and can be clamped by a screw terminal 217. The screw terminal 217 is clamped on the inner wall 205 by means of screws 218.

In another embodiment example the butting flap 216 can be screwed onto the inner wall 205 or, resp. the inner edge 204 of the roof opening at a place as required each time, by means of a screw 219.

From FIG. 19 it clearly appears that at least one portion of the inner face of the downward pointing side 214 of the U-shaped region 212 of the hook 211 is resting against the lower side of the inner edge 204 of the roof opening. The tightening pull, therefore, is not transferred to the fixture of the hook on the inner wall 205 but rather is caught by the inner edge 204 of the roof opening 208.

From FIG. 19 it further appears that the detachable fixture 201 is positioned outside the region of the roof opening 203. In connection with the U-shaped configuration of the hooks 211, the result will be that the hooks 211 will not widen if the roof wind deflector 206 is tightened.

In detail, the upward pointing face 213 of the U-shaped region 212 of the hook 211 has an opening, of which the inner edge 221 is trimmed in according to the shape of the head 224 of a head nut 220 or the like for the tightening screw 222. Also any equal tightening screw or, resp. head nut whatsoever can be used without having any influence on the gist of the invention.

It is advantageous that the distance of the upward pointing face 213 of the U-shaped region 212 of the hook 211 and the roof 202 corresponds to the height of the heat nut 220. Hereby an especially good exploitation of the space conditions is rendered possible. In order to provide a locking of the detachable fixture 201, in one embodiment example a side face of the head nut 220 is resting against the bottom of the U-shaped region 212 of the hook 211.

I claim:

1. A detachable roof wind deflector for mounting on the sun roof of a motor vehicle, said wind deflector having a front wall and side walls, an air guide surface extending rearwardly from and at a selected angle to said front wall so as to rise gradually from the roof of the vehicle when situated on the roof, and said wind deflector having fastening means permitting adjustment of the wind deflector to accommodate various widths, said fastening means including an upper part attachable to the wind deflector, said upper part including a slide member arranged transversely to the longitudinal direction of the car roof, a slide element displaceable within said slide member, said slide element being connected to a lower part having a portion engaging the sun roof opening and means fixing said lower part to said sun roof opening.

2. The roof wind deflector as claimed in claim 1 wherein said slide member includes a recessed portion having a base and a slot in said base for receiving a portion of said sliding element.

3. The roof wind deflector as claimed in claims 1 or 2 wherein said slide member is provided with aligned bores corresponding to openings in said wind deflector for receiving fastening means for securing said slide member to said wind deflector.

4. The roof wind deflector as claimed in claim 2 wherein the portion of said slide member facing the vehicle roof is reinforced by rib means.

5. The roof wind deflector as claimed in claim 2 wherein said recess in said sliding member is made of sheet metal and is pressed into said sliding member.

6. The roof wind deflector as claimed in claim 2 wherein said sliding element is a screw having a head which rests on the bottom of said recess with the shaft of said screw extending through said slot.

7. A roof wind deflector as claimed in claim 6 wherein said head of said screw is hammer-shaped having curved upper and lower surfaces.

8. A detachable roof wind deflector for mounting on the sun roof of a motor vehicle, said wind deflector having a front wall and side walls, an air guide surface extending rearwardly and at a selected angle to said front wall so as to rise gradually from the roof of the vehicle when situated on the roof, said wind deflector having fastening means permitting adjustment of the wind deflector to accommdate various widths, said fastening means including an upper part attachable to the wind deflector, said upper part including a slide member arranged transversely to the longitudinal direction of the car roof, a slide element displaceable within said slide member, said slide element being connected to a lower part having a portion engaging the sun roof opening and means fixing said lower part to said sun roof opening, said slide member including a recessed portion having a base and a slot in said base for receiving a portion of said sliding element, said sliding element being in the form of a screw having a head which rests on the bottom of said recess with the shaft of said screw extending through said slide, the shaft of said screw being threaded and a nut being provided thereon with the lower most end of said shaft having a head member fastened thereon with an attachment means carried by said shaft between said nut and said head member, said attachment means having a portion engaging the frame of the sun roof.

9. The roof wind deflector as claimed in claim 8 wherein said head member of said threaded shaft an said attachment means have mutually engaging surfaces.

10. The roof wind deflector as claimed in claim 9 wherein said attachment means has portions which are of greater thickness to reinforce said attachment means.

11. The roof wind deflector as claimed in claim 8 wherein said attachment means is provided with a reinforcing member surrounding said threaded shaft and is inserted between said attachment means and said nut.

12. The roof wind deflector as claimed in claim 11 wherein said reinforcing member has an angle lug resting against a complementary portion of said attachment means.

13. The roof wind deflector as claimed in claim 12 wherein a square nut is carried on said threaded screw shaft and engages said reinforces member.

14. The roof wind deflector as claimed in claim 13 wherein said slide member has openings for receiving fastening devices which are threaded.

15. The roof wind deflector as claimed in claim 1 wherein said sliding member is riveted to said wind deflector.

16. The roof wind deflector as claimed in claim 13 wherein double-headed fastening members are inserted into said fastening openings to secure said slide member to said wind deflector.

17. The roof wind deflector as claimed in claim 1 or 2, wherein said slide member is provided with aligned bores and said wind deflector includes at least one dependent lug insertable into a said bore of said slide member, locking means insertable on a said lug for holding said slide member on said lug.

18. The roof wind deflector as claimed in claims 1 or 2 wherein said slide member is provided with lug means insertable through openings provided in said wind deflector, said lug means being deformable to retain said slide member in position on said wind deflector.

19. The roof wind deflector as claimed in claim 6 wherein said head of said screw has a longitudinal demension such that for each position of said head relative to said slot, said head will cover said slot.

20. The roof wind deflector as claimed in claim 8 wherein said attachment means is in the form of a hook which is secured to the sun roof opening by means of a selfcutting screw.

21. The roof wind deflector as claimed in claim 1 wherein said wind deflector having a flow off surface extending from the rear of said air guide surface at an angle substantially greater than said selected angle so as to rise steeply relative to said air guide surfac.

22. A roof wind deflector as claimed in claims 1 or 21 wherein said front wall curves gradually into said side walls and said front wall and said side walls curve gradually into the edges of said air guide surface.

23. The roof wind deflector as claimed in claim 21 wherein said flow off surface has a back wall surface extending steeply downwardly therefrom towards the roof of the motor vehicle.

24. The roof wind deflector as claimed in claim 23 wherein said back wall surface is provided with a reinforcing edge extending substantially at a right angle to said back wall surface.

25. The roof wind deflector as claimed in claim 1 or 21 wherein said air guide surface is provided with apertures for receiving retaining means theretrough.

26. The roof wind deflector as claimed in claims 1 or 21 wherein said front wall and side walls are provided with holding flap means extending downwardly therefrom.

27. The roof wind deflector as claimed in claim 26 wherein said deflector is injection with said holding flap means thereon.

28. The roof wind deflector as claimed in claim 26 wherein each said holding flap means is composed of a relatively thick holding arm projecting from the lower region of said front wall, a thin region extending downwardly and essentially vertically to the roof of a motor vehicle, said thin region running parallel to the respective inner wall of the roof opening while projecting into same.

29. The roof wind deflector as claimed in claims 1 or 21 wherein said front wall has lower flanges, said side wall and said lower flanges are provided with packing material which engages the roof of the motor vehicle.

30. The roof wind deflector as claimed in claims 1 or 21 wherein said front and side walls have an injection molded insert edge protruding downwardly therefrom for insertion into the sun roof of a motor vehicle.

31. The roof wind deflector as claimed in claim 30 wherein the outer surfaces of the front wall, side walls and those of said insert edge are all in alignment with each other.

32. The roof wind deflector as claimed in claim 30 wherein said insert edge is spaced inwardly relative to said front and side walls thereof.

* * * * *